(12) United States Patent
Staring et al.

(10) Patent No.: US 10,439,435 B2
(45) Date of Patent: Oct. 8, 2019

(54) WIRELESS INDUCTIVE POWER TRANSFER

(71) Applicant: KONINKLIJKE PHILIPS N.V., Eindhoven (NL)

(72) Inventors: Antonius Adriaan Maria Staring, Eindhoven (NL); Andries Van Wageningen, Wijlre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 307 days.

(21) Appl. No.: 15/508,553

(22) PCT Filed: Oct. 13, 2015

(86) PCT No.: PCT/EP2015/073605
§ 371 (c)(1),
(2) Date: Mar. 3, 2017

(87) PCT Pub. No.: WO2016/066417
PCT Pub. Date: May 6, 2016

(65) Prior Publication Data
US 2017/0279305 A1    Sep. 28, 2017

(30) Foreign Application Priority Data

Oct. 27, 2014 (EP) .................................... 14190425

(51) Int. Cl.
*H01F 27/42* (2006.01)
*H01F 37/00* (2006.01)
(Continued)

(52) U.S. Cl.
CPC .............. *H02J 50/10* (2016.02); *H02J 50/12* (2016.02); *H02J 50/40* (2016.02); *H02J 50/80* (2016.02); *H04B 5/0037* (2013.01)

(58) Field of Classification Search
USPC ......................................................... 307/104
See application file for complete search history.

(56) References Cited

U.S. PATENT DOCUMENTS

| 9,583,964 | B2 | 2/2017 | Murayama et al. |
| 2012/0313447 | A1 | 12/2012 | Park et al. |
| 2013/0234661 | A1* | 9/2013 | Yang ..................... H02J 7/0013 320/108 |

FOREIGN PATENT DOCUMENTS

JP          2014022780 A       2/2012

OTHER PUBLICATIONS

QI System Description, Wireless Power Transfer, vol. I: Low Power, Part 1: Interface Definition, Version 1.0, Jul. 2010.
(Continued)

*Primary Examiner* — Rexford N Barnie
*Assistant Examiner* — Toan T Vu

(57) ABSTRACT

A wireless power transfer system comprises a power transmitter generating a wireless power signal providing power to a plurality of power receivers (105, 109). The power transmitter (101) comprises a receiver (203) receiving data messages from the power receivers (105, 109) on a load modulation channel divided into time slots. A time slot processor (205) allocates time slots as dedicated time slots for individual power receivers or as common time slots for load modulation by any power receiver (105, 109). An identity controller (207) links a temporary identity to each of the power receivers (105) and a message processor (209) determines the source power receiver for messages in response to temporary identity information in the messages. Specifically, the message processor (209) determines the source for a first message received in a common time slot as the first power receiver (105) if the temporary identity information in the first message is indicative of a temporary identity assigned to the first power receiver (105).

12 Claims, 5 Drawing Sheets

(51) Int. Cl.
*H01F 38/00* (2006.01)
*H02J 50/10* (2016.01)
*H02J 50/40* (2016.01)
*H02J 50/12* (2016.01)
*H04B 5/00* (2006.01)
*H02J 50/80* (2016.01)

(56) References Cited

OTHER PUBLICATIONS

Wireless Power Consortium, Downloaded From http://www.wirelesspowerconsortium.com/index.html on Mar. 18, 2014, 2 Pages.

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2015/073605, filed on Oct. 13, 2015, which claims the benefit of European Patent Application No. 14190425.0, filed on Oct. 27, 2014. These applications are hereby incorporated by reference herein.

FIELD OF THE INVENTION

The invention relates to inductive power transfer and in particular, but not exclusively, to an inductive power transfer system compatible with some messages from a Qi power transfer system.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

An example of a wireless power transfer system is provided in US2013/0234661A1 which discloses a system wherein a wireless power transmitting device provides power to wireless power receiving devices based on communication with these. The communication is based on an individual assignment of an identity to each of the wireless power receiving devices.

Furthermore, such wireless power transfer arrangements may advantageously be designed such that the power transmitter device can be used with a range of power receiver devices. In particular, a wireless power transfer standard known as the Qi Specification has been defined and is currently being developed further. This standard allows power transmitter devices that meet the Qi Specification to be used with power receiver devices that also meet the Qi Specification without these having to be from the same manufacturer or having to be dedicated to each other. The Qi Specification further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

System Control

In order to control the wireless power transfer system, the Qi standard specifies a number of phases or modes that the system may be in at different times of the operation. More details can be found in chapter 5 of part 1 of the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

Although the current Qi Specification provides efficient power transfer and an attractive user experience in many scenarios and applications, it would be desirable to further enhance the user experience and to improve performance and operation. Therefore, work is ongoing to further develop the Qi Specification. Such work includes introducing new features, such as for example increasing the possible power levels substantially, simultaneously supporting multiple power receivers by a single power transmitter etc.

As part of the further development of the Qi Specification, the communication supported by the Specification is being enhanced. Specifically, communication from the power transmitter to the power receiver is being introduced. The intention is to introduce a low data rate communication link from the power transmitter to the power receiver. The low bandwidth of the link allows facilitated implementation and introduction of new communication functionality with reduced impact on existing communication functionality. Thus, improved compatibility with existing approaches and equipment is achieved. Accordingly, the communication from the power transmitter to the power receiver is likely to be substantially restricted compared to the communication from the power receiver to the power transmitter.

The bidirectional communication has further allowed the introduction of an additional, optional phase for setting operational parameters for the power transfer. This phase is known as the Negotiation phase and allows the power receiver and power transmitter to negotiate further parameters based on a negotiation protocol that relies on communications both from the power receiver to the power transmitter and from the power transmitter to the power receiver. Specifically, the negotiation phase allows the setting of parameters which the power receiver does not know whether the power transmitter supports or not (e.g. they may be introduced in later revisions of the specification). The bidirectional communication enables the power transmitter to indicate whether it accepts or rejects a proposed parameter setting by the power receiver. As an example, the power receiver may want to set a high power level than the minimum that is guaranteed by all power transmitters. The specific power transmitter can provide a response indicating whether it supports the requested power level or not. The setting of the parameters is therefore part of a negotiation between the power transmitter and the power receiver and it is not just dictated by the power receiver.

In general, it is desirable to further develop the Qi Specification to provide enhanced functionality, flexibility and performance. However, such a development of the standard must be made very carefully and must for example seek to optimize backwards compatibility and be compatible with other developments, such as for example an asynchronous bidirectional communication.

Conventionally, power transfer systems such as Qi systems are based on a one to one relationship between power transmitters and power receivers with a single power transmitter providing power to one power receiver at a time. However, it would be desirable to allow one power transmitter to be able to simultaneously transfer power to a plurality of power receivers. However, a critical issue for such scenarios is that of how to enable suitable communication between one power transmitter and multiple power receivers without this resulting in conflicts and interference. For example, if two power receivers individually use load modulation to transmit data messages to the power transmitter, the simultaneous communication of data messages from more than one power receiver will result in collisions and interference that will typically result in loss of both data messages.

Specifically, in a scenario where multiple power receivers are positioned on a power transmitter with the power receivers being powered by a wireless inductive power signal generated by the power transmitter, the communication from power receivers to power transmitter via the coupled coils and using e.g. load modulation can lead to collisions of the communication between power receivers and power transmitter.

This problem obviously occurs if the power transmitter has a relative large transmitter coil on which multiple power receivers can be positioned resulting in these receivers sharing the same power transmitter coil for receiving power and for communicating to the power transmitter. However, it will also occur e.g. in scenarios where the power transmitter has multiple (smaller) transmitter coils driven in parallel such that each power receiver can be coupled more directly to one or more transmitter coils.

Furthermore, the power receivers can typically not adapt their transmissions to the behavior of any other power receivers, as these can often not be detected by the individual power receiver. For example, the receiver coils may be weakly coupled to the transmitter coil(s). In such scenarios, the coupling between coils of different power receivers will typically be very low. Therefore, the load modulation of the power signal by one power receiver can typically not be detected by another power receiver.

Hence, an improved wireless power transfer would be advantageous and in particular, an approach allowing for increased flexibility, increased efficiency, facilitated implementation, increased backwards compatibility, reduced complexity, improved communication control, improved support for multiple power receivers and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for a wireless power transfer system, the power transmitter comprising: at least one transmit inductor arranged to generate a wireless inductive power signal for providing power to a plurality of power receivers powered by the power transmitter; a receiver for receiving data messages on a load modulation channel for load modulation of the wireless inductive power signal by the plurality of power receivers, the load modulation channel being divided into time slot frames with each time slot frame comprising a set of time slots; a time slot processor arranged to allocate time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers; an identity controller for linking a temporary identity to each of the plurality of power receivers, the temporary identity being different for each power receiver of the plurality of power receivers; and a message processor arranged to determine a source power receiver for messages from the plurality of power receivers in response to temporary identity information in the messages; wherein the identity controller is arranged to assign a first temporary identity to a first power receiver of the plurality of power receivers, the first power receiver being allocated a first dedicated time slot; and the message processor is arranged to determine the source power receiver for a first message received in a common time slot as the first power receiver in response to the temporary identity information in the first message being indicative of the first temporary identity.

The invention may provide improved performance and/or operation of a wireless power transfer system. In particular, improved support for a plurality of power receivers may be provided.

The approach may improve communication between power receivers and a power transmitter, and may in particular in many scenarios reduce the risk of communication errors, such as specifically the loss of data messages transmitted from power receivers by load modulation. The approach may specifically reduce the risk of conflicts or collisions between multiple power receivers load modulating the wireless inductive power signal. A flexible yet reliable sharing of a communication channel formed by load modulation of the wireless inductive power signal can be achieved.

The approach may allow differentiated communication where different communication characteristics can be provided for different message types. It further allows the power transmitter to determine the source of received messages using e.g. differentiated approaches that match the differentiated communication. For example, the source of messages in dedicated time slots may be determined based on which power receiver is allocated the dedicated time slot. The source of messages in common time slots may however be determined based on temporary identity information included in one or more of the messages. In many embodiments, the temporary identity information or data may be very short, such as typically one, two, three or four bits. The approach may thus allow a reduction in the overhead introduced by the support of a plurality of power receivers by reducing the amount of data required to identify the source of received messages.

The wireless inductive power signal provides a load communication channel which is available for load modulation by all of the supported power receivers, i.e. the load modulation channel is shared by the plurality of power receivers. The allocation of time slots to the plurality of receivers may be by the power receivers requesting a time slot and the power transmitter accepting or rejecting the request.

A dedicated time slot may be a time slot that is reserved for a single power receiver, i.e. only that power receiver may load modulate the wireless inductive power signal in that time slot. The allocation of a dedicated time slot may be on a semi-permanent basis, such as e.g. for the entire duration of the power transfer session for that power receiver. A common time slot may be one in which any of the power receivers may load modulate the wireless inductive power signal, i.e. it may be a time slot not explicitly assigned to one power receiver.

The linking of a temporary identity and a power receiver may for example be by the identity controller storing an entry in memory comprising the pair of the temporary identity and the power receiver. Typically, the power transmitter may only support a low number of possible temporary identities, such as e.g. eight temporary identities corresponding to a three-bit temporary identity. The temporary identities may be re-used for other power receivers when released by a current power receiver. The temporary identity may specifically provide a unique identification/differentiation between power receiver currently being supported by the power transmitter but may not provide a unique identification/differentiation between power receivers as such (and specifically not provide a unique identification between all possible power receivers).

The linking of a temporary identity to a power receiver may typically be considered equivalent to assigning the temporary identity to the power receiver. In accordance with an optional feature of the invention, the first temporary identity comprises an indication of the first dedicated time slot.

This may provide particularly efficient operation and may allow low complexity assignment of temporary identities to power receivers. It may provide an easy to determine temporary identity for a power receiver, and may in many embodiments allow the power transmitter and power receiver to independently determine the temporary identity, thereby avoiding the necessity of communicating the temporary identity between the power transmitter and power receiver.

In accordance with an optional feature of the invention, the time slot processor is arranged to assign a set of common time slots to the first power receiver in response to receiving the first message; and the message processor is arranged to determine the first power receiver as the source power receiver for load modulation messages received in the set of common time slots.

This may in many embodiments reduce the overhead as identification does not need to be included in all messages from the power receiver transmitted in common time slots.

In accordance with an optional feature of the invention, the message processor is arranged to determine the first power receiver as the source power receiver for at least one load modulation message received in the set of common time slots and not comprising temporary identity information indicative of the first temporary identity.

This may allow efficient operation with reduced overhead in many embodiments.

In accordance with an optional feature of the invention, at least one of the messages received in the set of common time slots includes temporary identity information indicative of the first temporary identity.

This may in many embodiments increase reliability of the operation.

In accordance with an optional feature of the invention, the first message is a request message requesting the power transmitter to enter a parameter setting mode for setting of an operational parameter for the power transfer to the source power receiver; and the power transmitter further comprises: a setting processor (201) arranged to adapt the parameter setting mode to set parameters for the source power receiver.

The approach may provide particularly advantageous operation for operations intended to change the settings of operational parameters for a power receiver. The power receiver may specifically request that a process is initiated to change the current parameters. The request may be communicated in a common time slot thereby providing flexibility and avoiding conflict with data communicated in the dedicated time slots. However, the approach further allows the parameter setting mode to be applied to individual power receivers while allowing other power receivers to continue the current operation (e.g. power transfer) without interruptions or modifications being necessary.

The parameter setting mode may specifically correspond to a configuration or negotiation phase.

In accordance with an optional feature of the invention, a set of message types are specific to the parameter setting mode; and the message processor is arranged to associate received messages of a type belonging to the set of message types to the source power receiver when the parameter setting mode is active.

This may in many embodiments reduce the overhead as identification does not need to be included in all messages from the power receiver transmitted in common time slots.

In accordance with an optional feature of the invention, the power transmitter is arranged to reject a request to enter a parameter setting mode for a second power receiver if the power transmitter is operating in a parameter setting mode for the first power receiver.

This may increase reliability and robustness of the operation in many scenarios.

In accordance with an optional feature of the invention, the identity controller is arranged to terminate the link between the first temporary identity and the first power receiver in response to at least one of: a detection of no messages being received from the first power receiver in a set of time slots meeting a criterion; a power transfer termination message being received from the first power receiver; a termination of a power transfer session to the first power receiver; and a release of a dedicated time slot for the first power receiver.

This may provide improved operation in many embodiments.

According to an aspect of the invention there is provided a power receiver for a wireless power transfer system including a power transmitter arranged to provide a power transfer to a plurality of power receivers via a wireless inductive power signal generated by at least one transmit inductor of the power transmitter; the power receiver comprising: at least one receive inductor arranged to extract power from the wireless inductive power signal; a transmitter for transmitting data messages to the power transmitter by load modulation of the wireless inductive power signal; a time slot controller arranged to control the transmitter to transmit the data messages in either dedicated time slots assigned to the power receiver or in common time slots available for load modulation by any power receiver of the plurality of power receivers; a message generator arranged to include temporary identity information indicative of a first temporary identity assigned to the power receiver in at least one data message transmitted in a common time slot.

According to an aspect of the invention there is provided wireless power transfer system comprising a power transmitter arranged to provide a power transfer to a plurality of power receivers via a wireless inductive power signal, wherein the power transmitter comprises: at least one transmit inductor arranged to the a wireless inductive power signal, a receiver for receiving data messages on a load modulation channel for load modulation of the wireless inductive power signal by the plurality of power receivers, the load modulation channel being divided into time slot frames with each time slot frame comprising a set of time slots, a time slot processor arranged to allocate time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers, an identity controller for linking a temporary identity to each of the plurality of power receivers, the temporary identity being different for each power receiver of the plurality of power receivers, and a message processor arranged to determine a source power receiver for messages from the plurality of power receivers in response to temporary identity information in the messages, and the identity controller is arranged to assign a first temporary identity to a first power receiver of the plurality of power receivers, the first power receiver being allocated a first dedicated time slot, and the message processor is arranged to determine the source power receiver for a first message received in a common time slot as the first power receiver in response to the temporary identity information in the first message being indicative of the first temporary identity; and at least one power receiver of the plurality of power receivers comprises: at least one receive inductor arranged to extract power from the wireless inductive power signal, a transmitter for transmitting data messages to the power transmitter by load modulation of the wireless inductive power signal, a time slot controller arranged to control the transmitter to transmit the data messages in either dedicated time slots assigned to the power receiver or in common time slots available for load modulation by any power receiver of the plurality of power receivers, and a message generator arranged to include temporary identity information indicative of a first temporary identity assigned to the power receiver in at least one data message transmitted in a common time slot.

According to an aspect of the invention there is provided a method of operation for a power transmitter of a wireless power transfer system, the method comprising: generating a wireless inductive power signal for providing power to a plurality of power receivers powered by the power transmitter; receiving data messages on a load modulation channel for load modulation of the wireless inductive power signal by the plurality of power receivers, the load modulation channel being divided into time slot frames with each time slot frame comprising a set of time slots; allocating time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers; linking a temporary identity to each of the plurality of power receivers, the temporary identity being different for each power receiver of the plurality of power receivers; and determining a source power receiver for messages from the plurality of power receivers in response to temporary identity information in the messages; wherein the linking comprises linking a first temporary identity to a first power receiver of the plurality of power receivers, the first power receiver being allocated a first dedicated time slot; and the determining of the source power receiver comprises determining the source power receiver for a first message received in a common time slot as the first power receiver in response to the temporary identity information in the first message being indicative of the first temporary identity.

According to an aspect of the invention there is provided a method of operation for a power receiver of a wireless power transfer system further including a power transmitter arranged to provide a power transfer to a plurality of power receivers via a wireless inductive power signal generated by at least one transmit inductor of the power transmitter; the method comprising: extracting power from the wireless inductive power signal; transmitting data messages to the power transmitter by load modulation of the wireless inductive power signal; controlling the transmitter to transmit the data messages in either dedicated time slots assigned to the power receiver or in common time slots available for load modulation by any power receiver of the plurality of power receivers; and including temporary identity information indicative of a first temporary identity assigned to the power receiver in at least one data message transmitted in a common time slot.

According to an aspect of the invention there is provided a method of operation for a wireless power transfer system comprising a power transmitter arranged to provide a power transfer to a plurality of power receivers via a wireless inductive power signal, the method comprising: the power transmitter performing the steps of: generating the wireless inductive power signal for providing power to a plurality of power receivers powered by the power transmitter; receiving data messages on a load modulation channel for load modulation of the wireless inductive power signal by the plurality of power receivers, the load modulation channel being divided into time slot frames with each time slot frame comprising a set of time slots; allocating time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers; linking a temporary identity to each of the plurality of power receivers, the temporary identity being different for each power receiver of the plurality of power receivers; and determining a source power receiver for messages from the plurality of power receivers in response to temporary identity information in the messages; wherein the linking comprises linking a first temporary identity to a first power receiver of the plurality of power receivers, the first power receiver being allocated a first dedicated time slot; and the determining of the source power receiver comprises determining the source power receiver for a first message received in a common time slot as the first power receiver in response to the temporary identity information in the first message being indicative of the first temporary identity; and at least the first power receiver performing the steps of: extracting power from the wireless inductive power signal; transmitting data messages to the power transmitter by load modulation of the wireless inductive power signal; controlling the transmitter to transmit the data messages in either dedicated time slots assigned to the power receiver or in common time slots available for load modulation by any power receiver of the plurality of power receivers; and including temporary identity information indicative of a first temporary identity assigned to the power receiver in at least one data message transmitted in a common time slot.

These and other aspects, features and advantages of the invention will be apparent from and elucidated with reference to the embodiment(s) described hereinafter.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
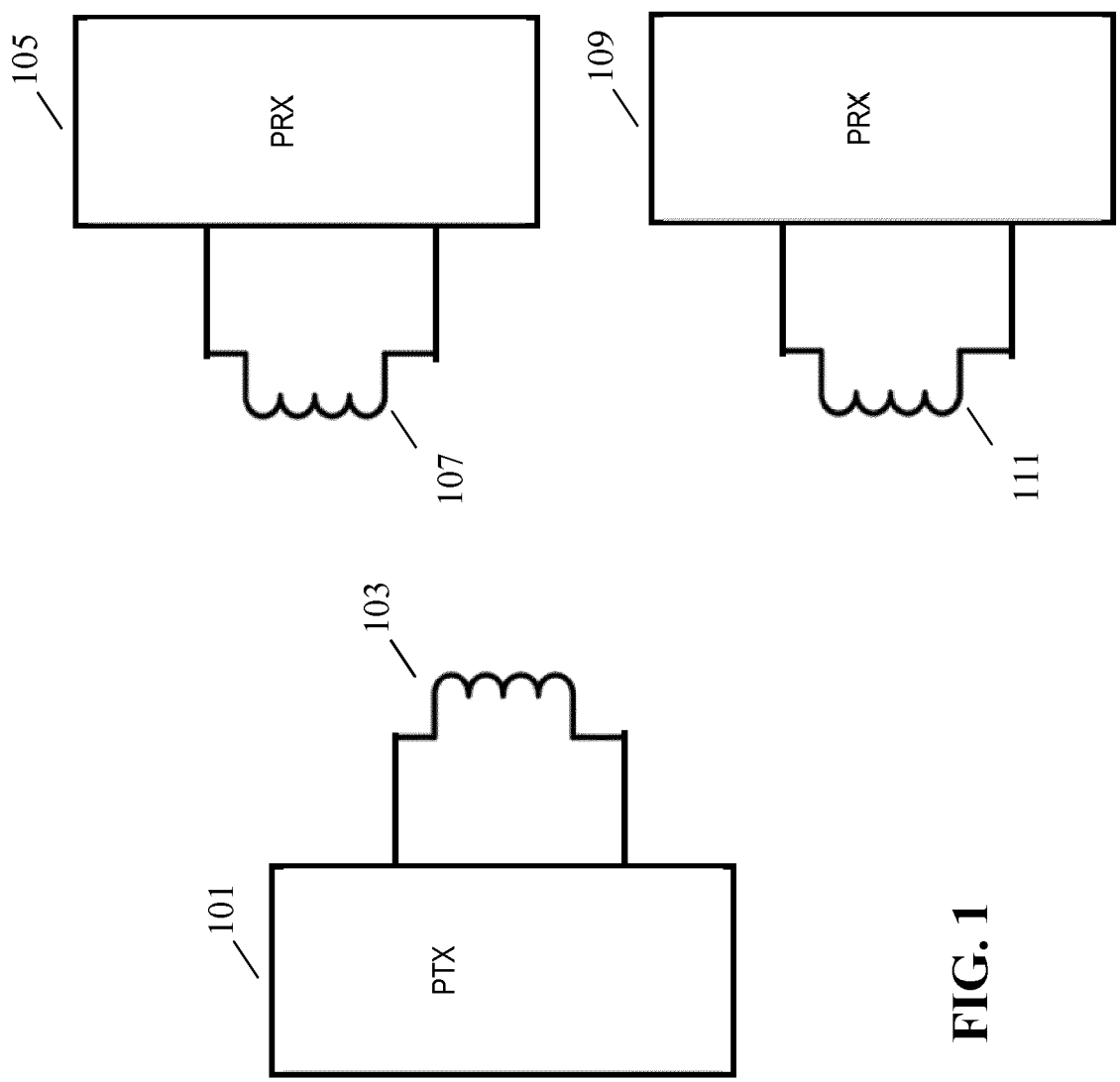
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a first power receiver 105 which includes (or is coupled to) a receiver coil/inductor 107. The power transfer system also comprises a second power receiver 109 which includes (or is coupled to) a second receiver coil/inductor 111.

The system provides a wireless inductive power transfer from the power transmitter 101 to the first and second power receivers 105. Specifically, the power transmitter 101 generates a wireless inductive power signal (also for brevity referred to as a power signal or an inductive power signal), which is propagated as a magnetic flux by the transmitter coil 103. The power signal may typically have a frequency between around 100 kHz to 200 kHz. The transmitter coil 103 and the receiver coils 107, 111 are loosely coupled and thus the receiver coils 107, 111 pick up (at least part of) the power signal from the power transmitter 101. Thus, the power is transferred from the power transmitter 101 to the power receivers 105, 109 via a wireless inductive coupling from the transmitter coil 103 to the receiver coils 107, 111. The term power signal is mainly used to refer to the inductive signal/magnetic field between the transmitter coil 103 and the receiver coils 107, 111 (the magnetic flux signal), but it will be appreciated that by equivalence it may also be considered and used as a reference to an electrical signal provided to the transmitter coil 103 or picked up by a receiver coil 107, 111.

In the system of FIG. 1, the power transmitter 101 supports multiple power receivers (of which two 105, 109 are shown) simultaneously. A magnetic field is generated by the transmitter coil 103 and both the first and second receiver coils 107, 111 are within this magnetic field. Thus, the variations in the magnetic flux introduced by the transmitter coil 103 result in a current being induced in both the first and the second receiver coil 107, 111. Specifically, in the system of FIG. 1 both the first and the second receiver coil 107, 111 are loosely coupled to the transmitter coil 103.

In the following, the operation of the power transmitter 101 and the power receivers 105, 109 will be described with specific reference to an embodiment in accordance with the Qi Specification (except for the herein described (or consequential) modifications and enhancements). In particular, the power transmitter 101 and the power receivers 105, 109 may be compatible with most of the operation described in Qi Specification version 1.0 or 1.1 (except for the herein described (or consequential) modifications and enhancements).

To control the power transfer, the system may proceed via different phases, in particular a selection phase, a ping phase, identification and configuration phase, and a power transfer phase. More information can be found in chapter 5 of part 1 of the Qi wireless power specification.

For example, when setting up communication with the first power receiver 105, the power transmitter 101 may initially be in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The first power receiver 105 can apply the received signal to power up its electronics. After receiving the power signal, the power receiver 105 communicates an initial packet to the power transmitter 101. Specifically, a signal strength packet indicating the degree of coupling between the power transmitter 101 and the first power receiver 105 is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to an optional negotiation phase wherein further operational parameters are set based on an interactive negotiation process between the power transmitter 101 and the power receiver 105.

Following the negotiation phase, the system enters the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

Thus, in order to prepare and control the power transfer between the power transmitter 101 and the power receivers 105, 109 in the wireless power transfer system, the power receivers 105, 109 communicate information to the power transmitter 101. Such communication has been standardized in the Qi Specification version 1.0 and 1.1.

On the physical level, the communication channel from each of the power receivers 105, 109 to the power transmitter 101 is implemented by using the wireless inductive power signal as carrier. The power receivers 105, 109 transmit data messages by modulating the load of the respective receiver coil 107, 111. This results in corresponding variations in the power signal at the power transmitter side. The load modulation may be detected by a change in the amplitude and/or phase of the transmitter coil current, or alternatively or additional by a change in the voltage of the transmitter coil 103. Based on this principle, the power receivers 105, 109 can modulate data which the power transmitter 101 can then demodulate. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

Thus, in the system, the wireless inductive power signal provides a load modulation channel for load modulation by the power receivers 105, 109.

Figure 2:
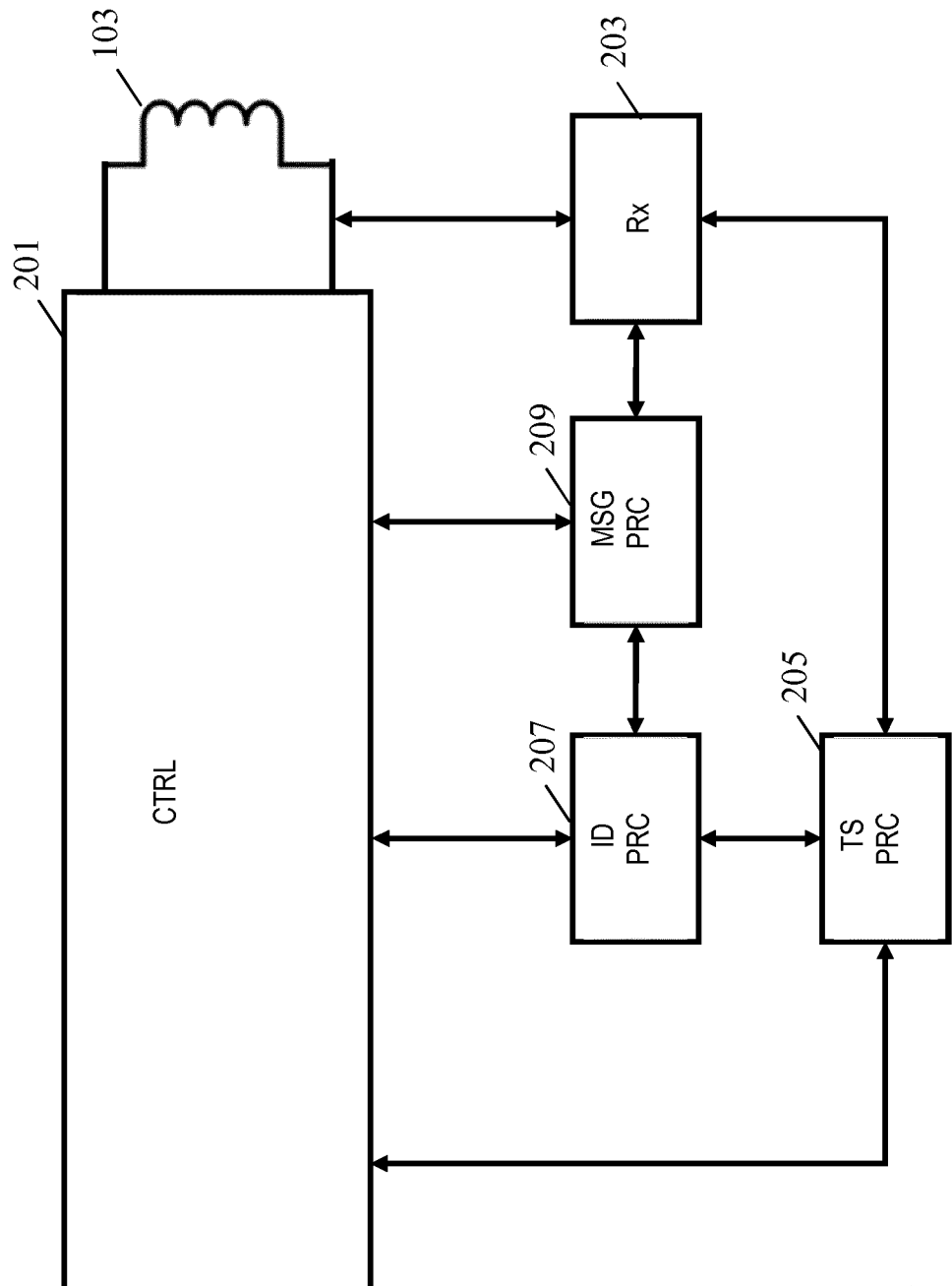
FIG. 2 illustrates an example of elements of a power transmitter in accordance with some embodiments of the invention.

FIG. 2 illustrates some exemplary elements of the power transmitter 101 of FIG. 1.

FIG. 2 illustrates a power transmitter controller 201 which is coupled to the transmit coil 103 and which generates an electrical power signal and provides this to the transmit coil 103. Thus, the power transmitter controller 201 provides the wireless inductive power signal to the power receiver 105 via the transmit coil 103 (and the receive coil 107).

The power transmitter controller 201 generates the current and voltage which is fed to the transmitter coil 103. The power transmitter controller 201 typically includes a drive circuit in the form of an inverter which generates an alternating signal from a DC Voltage.

Figure 3:
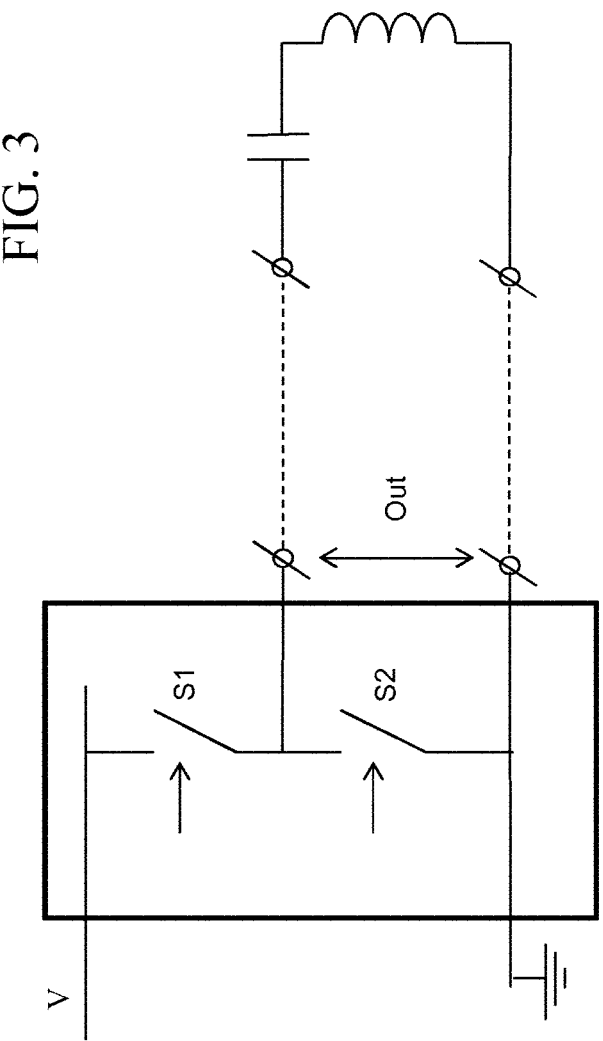
FIG. 3 illustrates an example of elements of a half-bridge inverter for a power transmitter in accordance with some embodiments of the invention.
Figure 4:
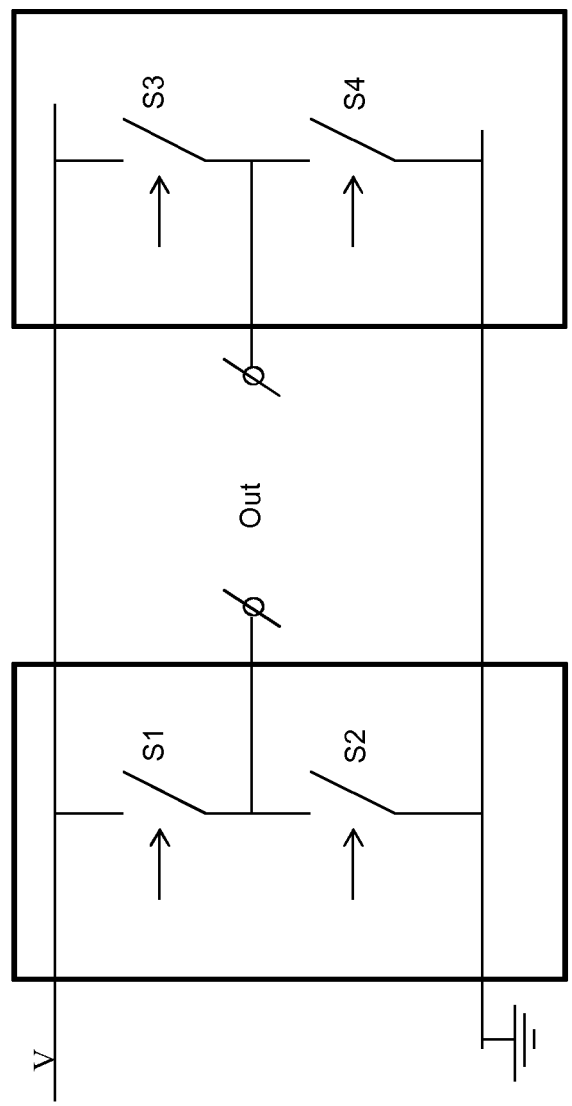
FIG. 4 illustrates an example of elements of a full-bridge inverter for a power transmitter in accordance with some embodiments of the invention.

FIG. 3 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The power transmitter controller 201 also comprises control functionality for operating the power transfer function and may specifically comprise a controller arranged to operate the power transmitter 101 in accordance with elements of the Qi Specification. For example, the controller may be arranged to perform the Identification and Configuration phase as well as the power transfer phase of the Qi Specification.

In the example, the power transmitter 101 comprises a single transmitter coil 103 which is driven by the power transmitter controller 201. Thus, the wireless inductive power signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the power transmitter controller 201 may be used to generate the wireless inductive power signal. For example, two transmitter coils may be positioned at different positions to provide two charging points for two power receivers. The two coils may be fed the same output signal from the power transmitter controller 201. This may allow an improved distribution of the wireless inductive power signal/magnetic field in order to support multiple charging points.

The power transmitter 101 further comprises a receiver 203 which is arranged to receive data messages from power receivers. Specifically, the receiver 203 is arranged to detect load modulation of the wireless inductive power signal and to decode such load modulation to determine the corresponding data. As indicated in FIG. 2, the receiver 203 may specifically be arranged to detect the load modulation by detecting e.g. variations of the current through the transmitter coil 103. It will be appreciated that in other embodiments, other approaches may be used, such as e.g. detecting the supply current variations to the inverter of the power transmitter controller 201 etc.

Figure 5:
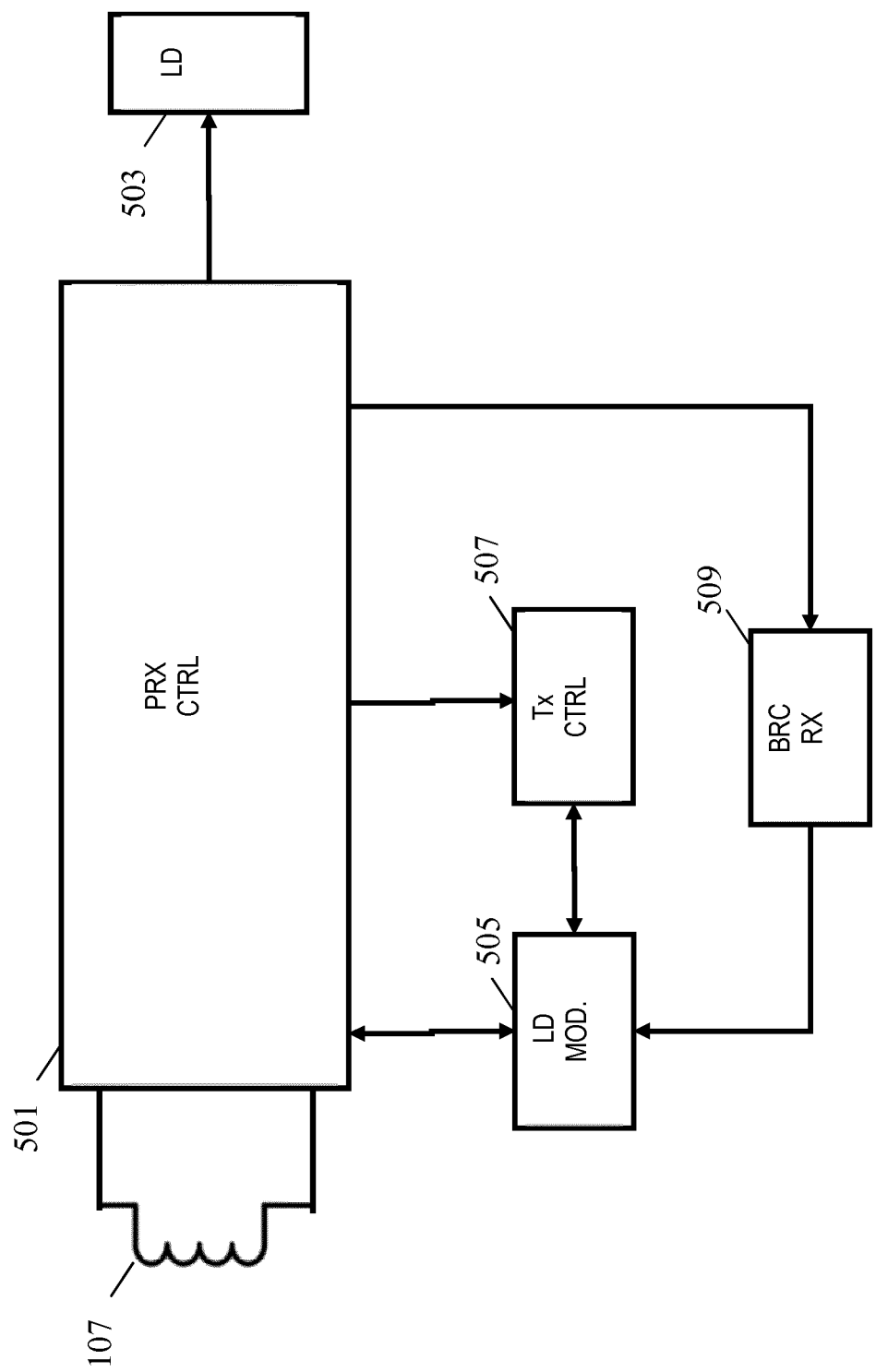
FIG. 5 illustrates an example of elements of a power receiver in accordance with some embodiments of the invention.

FIG. 5 illustrates some exemplary elements of the first power receiver 105. Although the description of the power receivers will focus on the first power receiver 105 it will be appreciated that it may equally apply to other power receivers supported by the power transmitter 101, such as specifically to the second power receiver 109.

The receiver coil 107 is coupled to a power receiver controller 501, which comprises various functionality for operating the first power receiver 105, and is in the specific example arranged to operate the first power receiver 105 in accordance with aspects of the Qi Specification. For example, the first power receiver 105 may be arranged to perform the Identification and Configuration phase and the power transfer phase of the Qi Specification.

The power receiver controller 501 is arranged to receive the wireless inductive power signal and to extract the power during the power transfer phase. The power receiver controller 501 is coupled to a power load 503 which is the load powered from the power transmitter 101 during the power transfer phase. The power load 503 may be an external power load but is often part of the power receiver device, such as a battery, display or other functionality of the power receiver (e.g. for a smart phone the power load may correspond to the combined functionality of the smart phone).

The first power receiver 105 comprises a load modulation transmitter 505 which is arranged to transmit data messages to the power transmitter 101 by load modulation of the wireless inductive power signal. Thus, the load modulation transmitter 505 may transmit messages to the power transmitter 101 using the load modulation channel provided by the wireless inductive power signal. The data messages may for example be configuration messages in the Identification and Configuration phase or power control error messages in the power transfer phase. The data messages may specifically comprise one or more bits and may e.g. be load modulated onto the wireless inductive power signal.

In the arrangement of FIG. 1, all power receivers 105, 109 supported by the power transmitter 101 can load modulate the wireless inductive power signal. The power transmitter 101 receives the transmitted data by measuring the load and detecting load changes, e.g. it may measure changes in the current of the transmitter coil 103. However, as such variations will be affected by both the load modulation of the first power receiver 105 and the load modulation of the second power receiver 109, simultaneous load modulations will interfere with each other. Therefore, if the power receivers 105, 109 simultaneously transmit a data message to the power transmitter 101, the load modulations will interfere resulting in at least one of the data messages often not being correctly received by the power transmitter 101. This may result in degraded operation. For example, if both power receivers 105, 109 are in the power transfer phases, collisions between the transmissions of the control error messages will result in degraded power control loop performance.

In the system of FIG. 1, the wireless inductive power signal provides communication channel in the form of a load modulation channel for communication of messages from the power receivers 105, 109 to the power transmitter 101 by load modulation. Further to reduce the risk of interference and conflicts, a time slot multiple access approach is used for the load modulation channel, and specifically the load modulation channel is in the temporal domain divided into repeating time slot frames with each time slot frame comprising a plurality of time slots. In the specific description, a time slot framework is used where the load modulation channel is divided into repeating time slot frames each comprising nine time slots (of the same duration). In the example, the nine time slots of a frame may be numbered as 0-8.

It will be appreciated that in other examples or embodiments structures, other numbers of time slots in each time slot frame may be used. For example, in many scenarios each time slot frame may comprise eight time slots.

In the system, the power receivers 105, 109 are arranged to communicate in the time slots. Thus, when a power receiver transmits a message by load modulating the wireless inductive power signal, it will constrain the duration of this message to be within one time slot. Accordingly, power receivers 105, 109 transmitting in different time slots will not interfere with each other.

The power transmitter 101 comprises a time slot processor 205 which is arranged to control the communication operation of the power receiver 105 to comply with the time slot structure.

The time slot processor 205 is specifically arranged to allocate/assign/link one or more time slots to power receivers.

Specifically, in the system, the time slot processor 205 may allocate dedicated time slots to one or more of the power receivers 105, 109. A dedicated time slot may specifically be allocated to one power receiver for the duration of the power transfer session for the power receiver. Accordingly, the dedicated time slot can only be used by that power receiver and is not available for load modulation by any of the other power receivers.

The use of dedicated time slots may specifically guarantee communication resource being available for the specific power receiver with given time characteristics. For example, by allocating one time slot of each time slot frame to the first power receiver 105, it can be assured that the first power receiver 105 is able to transmit one data message to the power transmitter 101 in each time slot frame. Thus, it can be guaranteed that some messages can be communicated quite frequently. In the system, the dedicated time slots are used to communicate time critical data from the power receivers 105, 109 to the power transmitter 101.

Typically, one dedicated time slot will be allocated to each of the power receivers 105, 109 receiving power from the power transmitter. For example, the first power receiver 105 may be allocated time slot #0 and the second power receiver 109 may be allocated time slot #1. The first power receiver 105 may then transmit time critical data in specific messages in time slot #0 and the second power receiver 109 may transmit time critical data in specific messages in time slot #1. For example, during the power transfer phase, the power receivers 105, 109 may transmit the power control messages using the dedicated time slots.

In addition to the dedicated time slots, the time slot frame will also include one or more common time slots. These time slots are not specifically (semi-permanently) allocated to individual power receivers, but are available for load modulation by any of the power receivers receiving power from the power transmitter 101.

Thus, the time slot processor 205 may allocate some specific time slots to individual power receivers for the duration of the power transfer session for these power receivers. In addition, a set of time slots may be allocated as common time slots which can dynamically be used by any of the power receivers on an ad-hoc basis.

Similarly to the power transmitter 101, the first power receiver 105 comprises a time slot controller 507 which is arranged to control the data transmissions (i.e. the load modulation) from the first power receiver 105 to be in the appropriate time slots.

Specifically, the time slot controller 507 may control the transmission of the data messages containing time critical information to be in the dedicated time slot allocated to the first power receiver 105. In addition, it may control the transmission of other messages to be in a common time slot. For example, a scenario may occur where the first power receiver 105 seeks to change a parameter setting, such as e.g. the allocated a guaranteed power level. It may accordingly transmit a request to enter a re-negotiation or re-configuration phase wherein the parameter may be changed. Accordingly, the first power receiver 105 transmits a request message and the time slot controller 507 controls the transmission of this to be in a common time slot.

In the example of FIG. 5, the first power receiver 105 comprises a message generator 509 which generates the messages to be transmitted. These are fed to the transmitter 505 which is also coupled to the time slot controller 507 that controls the timing of the transmission of the messages to fit within the time slot structure, i.e. it times the transmission of the messages to be in the dedicated time slot or in a common time slot as appropriate.

The system accordingly provides two different paths for transmission of data from the power receivers 105, 109 to the power transmitter 101. One is by using the dedicated time slots. These are typically used exclusively for specific messages that carry time critical information and which are known to be communicated at frequent intervals. For these dedicated time slots, the power transmitter 101 will know which specific power receiver the time slot is allocated to, and accordingly it will know the source from which the message is received, i.e. the source power receiver is known.

However, when the power transmitter 101 receives a message in a common time interval, it does not inherently know which of the power receivers 105, 109 is the source of the message. This may be a significant problem in many scenarios. For example, if a request message is received for the power transmitter 101 to enter a re-negotiation phase to change a parameter setting (e.g. the allocated maximum power level), the power transmitter 101 may agree to do this and accordingly acknowledge the request. It may then enter the re-negotiation phase to change the parameters. However, unless the power transmitter 101 knows which power receiver is requesting the re-negotiation, it is not able to determine which settings to change.

Thus, when expanding a wireless power transfer system from having a one to one correspondence between power transmitter and power receiver to a system supporting a plurality of power receivers from the same power transmitter, a number of additional problems arise. The described system utilizes a time slot approach to support multiple power receivers and in addition uses two different types of time slots in order to support different types of data from the power receivers. In addition, the system of FIG. 1 uses temporary identities assigned to the power receivers 105, 109 for at least some message transmitted on the common time slots. In contrast, the messages transmitted on the dedicated time slots may not include any identity information. Thus, a different approach can be used for different messages dependent on whether these are transmitted in a dedicated time slot or in a common time slot.

In the system of FIG. 1, the power transmitter 101 comprises an identity controller 207 which is arranged to link a temporary identity to each of the plurality of power receivers 105, 109 allocated a dedicated time slot, where the temporary identity is different for different power receivers. The temporary identity is in most embodiments very short, and indeed may in many embodiments be restricted to e.g. three bits depending on how many power receivers and/or time slots are supported.

In some embodiments, the identity controller 207 may link a power receiver and a temporary identity whenever a dedicated time slot is allocated to a power receiver. For example, if a power receiver request the allocation of a dedicated time slot, the power transmitter 101 may proceed to acknowledge the request and assign the dedicated time slot. Further in response to the request, the identity controller 207 proceeds to link a temporary identity to the power receiver.

The allocation of a dedicated time slot and temporary identity may for example occur during the initial communication e.g. just before the configuration or negotiation phases. For example, the power receiver may transmit a request for a dedicated time slot on a common time slot with its first message. If the power transmitter does not detect any conflict (e.g. if the time slot is not used by any other power receiver), the power transmitter may proceed to acknowledge the request and this will result in the common time slot used by the power receiver now being allocated as dedicated time-slot to the power receiver for the duration of the session. Thus, the common time slot becomes a dedicated time slot for the power receiver. This is known by both the power transmitter and the power receiver and accordingly the power receiver will proceed to transmit messages using this time slot, and the power transmitter will understand that messages received in this time slot are from that specific power receiver.

In addition to assigning the time slot, the identity controller 207 may proceed to determine a temporary identity for the power receiver. This temporary identity need only be sufficiently large to differentiate between the supported power receivers and accordingly can be kept very short. Typically, a temporary identity of e.g. 3 bits are used.

The determined temporary identity may in some embodiments be transmitted to the power receiver. In other embodiments, the power transmitter may accept an identity suggested by the power receiver. Thus, both the power transmitter 101 and the power receiver will be aware of the temporary identity.

The message generator 509 of the power receiver can now proceed to include temporary identity information indicative of this temporary identity in one or more messages that are transmitted in a common time slot. Specifically, it can include the temporary identity directly, i.e. the temporary identity information may simply be the temporary identity. As the temporary identity can be kept very short, the overhead is kept very low.

Accordingly, the identity controller 207 generates a link between a temporary identity and each of the power receivers 105, 109. Thus, each of the power receivers 105, 109 is associated with a temporary identity and when a message is received comprising temporary identity information indicative of a given temporary identity, the power transmitter 101 can identify which of the possible power receivers 105, 109 the temporary identity is linked/associated with, and it can accordingly determine which supported power receiver is the source of the message, i.e. which of the power receivers 105, 109 is the source power receiver.

For this purpose, the power transmitter 101 comprises a message processor 209 which is arranged to determine a source power receiver for messages from the plurality of power receivers 105, 109 in response to temporary identity information in the messages. Specifically, when a message is received in a common time slot, the message processor 209 may extract temporary identity information/data and may determine the temporary identity indicated by this data. It may then determine which power receiver is linked to the temporary identity, and accordingly determine this power receiver to be the source power receiver for the message.

Specifically, if a first message is received in a common time slot comprising temporary identity information indicative of a first temporary identity being linked with the first power receiver 105, the message processor 209 proceeds to determine the source power receiver for the first message as the first power receiver 105.

The approach thus provides a very efficient and reliable support of load modulation communication of the wireless inductive power signal by a plurality of power receivers 105, 109. The approach provides both flexibility and low communication overhead, yet allows the source of messages to be reliably identified.

In the previous example, the temporary identity is determined by the identity controller 205 and communicated from the power transmitter 101 to the first power receiver 105. However, in many embodiments, the power transmitter 101 and the first power receiver 105 may determine the temporary identity without additional communication.

Specifically, in many embodiments, the temporary identity for a power receiver may comprise an indication of the dedicated time slot assigned to the power receiver. For example, the temporary identity may be set to be the number of the time slot in which the first power receiver 105 transmitted the request for a dedicated time slot (i.e. the common time slot which is converted into a dedicated time slot for the first power receiver 105). The identity controller 205 can directly determine this time slot number without any additional information from the first power receiver 105. Similarly, when the first power receiver 105 receives acknowledgement that the used time slot has been allocated to the first power receiver 105 as a dedicated time slot, it knows that the assigned temporary identity is the number of this time slot. Thus, no further communication is required. A particular advantage of the approach is that the temporary identity in this case automatically follows the allocation of the dedicated time slot. Thus, the temporary identity will be allocated as long as the dedicated time slot is, and thus typically the temporary identity/dedicated time slot will be allocated during the power transfer session setup procedure and the allocation will typically last for the duration of the session.

In many embodiments, the first temporary identity comprises an indication of the dedicated time slot allocated to the first power receiver 105. Thus, the data messages in the common time slot can be linked to the transmissions in the dedicated time slot by comprising a temporary identity which indicates the dedicated time slot. Specifically, the temporary identity may be the number of the dedicated time slot.

In many embodiments, the message transmitted in the common time slot may specifically be a request to enter a parameter setting mode for setting of an operational parameter for the power transfer to the source power receiver.

For example, the first power receiver 105 may transmit a request message requesting that the power transmitter 101 enters a negotiation and/or a configuration phase in which operational parameters can be set for the power transfer session.

In systems such as Qi, the initialization of a power transfer session typically includes the power transmitter 101 and the first power receiver 105 together entering a configuration phase in which various parameters are set, such as for example the maximum power level, or the time-window in which the received power is measured. In some systems, the power transmitter 101 and the first power receiver 105 may also enter a negotiation phase in which other operational parameters can be set, such as for example a higher maximum power level that might not be supported by the power transmitter, or a guaranteed power level that is more than the default of 5 W.

A difference between a configuration phase and a negotiation phase may be that the configuration phase is based only on unidirectional (one-way) communication from the first power receiver 105 to the power transmitter 101 whereas the negotiation phase may utilize bidirectional (two-way) communication. In the configuration phase, the power receiver may e.g. simply inform the power receiver of which parameters it requires. The power transmitter must then follow and set the parameters accordingly. In the negotiation phase, the power receiver requests parameter settings and these parameter settings can then be accepted or rejected by the power transmitter.

As an example, an operating parameter that can be set in these phases is the power level. Every power transmitter may be required to support up to 5 W (for a receiver with reasonable coupling and efficiency). However, if higher powers are required, this needs to be negotiated. Thus, the power receiver may in the negotiation phase request the higher power level and the power transmitter may then accept or reject this request.

However, whereas the operational parameters are typically set during initialization of a power transfer phase, it may also sometimes be desirable to change parameters that have previously been set. For example, the loading of a power receiver may change substantially and therefore it may be desirable to re-negotiate the maximum guaranteed power that can be extracted by the power receiver.

For example, in the system of FIG. 1, the first power receiver 105 may in the power transfer phase desire an operational parameter to be changed, and accordingly it may proceed to generate a request message requesting that the power transmitter 101 enters a parameter setting mode for the first power receiver 105. The request message may not be possible to send in the dedicated time slot as this may typically be fully used up by communication of dedicated time critical data messages, or e.g. the system may simply not be designed for such messages being transmitted in the dedicated time slot. Accordingly, the request message is transmitted in one of the common time slots.

When the power transmitter 101 receives the request message for entering the parameter setting mode (specifically entering a (re-configuration phase or a (re-negotiation phase), it proceeds to enter the parameter setting mode. Specifically, the power transmitter controller 201 may in response to the message processor 209 receiving the request message be entered into the parameter setting mode to set parameters for first power receiver 105.

However, in contrast to conventional approaches where there is a one-to-one correspondence between the power transmitter and power receiver, the power transmitter 101 of FIG. 1 should only operate the parameter setting mode for the specific power receiver requesting it, i.e. in the present case the parameter setting mode should only be entered for the first power receiver 105 whereas the system should continue in the power transfer mode for the second power receiver 109.

Accordingly, the first power receiver 105 is arranged to include an indication of the temporary identity in the request message. Specifically, the request message may include bits indicating the time slot number allocated to the first power receiver 105.

When the request message is received by the message processor 209, it extracts the temporary identity information and identifies which of the power receivers 105, 109 is linked with this information. In the specific example, it determines that the message is received from the first power receiver 105 and therefore it proceeds to forward this information to the power transmitter controller 201 which accordingly proceeds to enter the parameter setting mode for the first power receiver 105 (but not for the second power receiver 109). When in the parameter setting mode, the power transmitter 101 and first power receiver 105 may e.g. proceed to set the operational parameters using the same protocol and approach as during power transfer initialization. Specifically, it may effectively perform a re-configuration and/or re-negotiation phase.

In some embodiments, the messages communicated from the first power receiver 105 to the power transmitter 101 during the parameter setting mode may also include the temporary identity for the first power receiver 105. Thus, these messages, in the following also referred to as parameter setting messages, may be transmitted in the common time slots with each of them comprising the temporary identity of the first power receiver 105 thereby allowing the messages to be identified as originating at the first power receiver 105.

The approach may be suitable e.g. for systems where the power transmitter 101 may simultaneously enter parameter setting modes for a plurality of power receivers.

However, in many embodiments, approaches may be employed in which the temporary identity of the first power receiver 105 is not included in all messages.

Specifically, in some embodiments, a set of message types may be specific to the parameter setting mode and thus these messages can only be transmitted from a power receiver when this is in a parameter setting mode (e.g. when in the configuration phase or in the negotiation phase) and not when it is in the power transfer phase.

In some embodiments, the message processor 209 may detect that a message received in a common time slot belongs to the type of messages that can only be transmitted from a power receiver in the parameter setting mode. Accordingly, when such a message is received, the message processor 209 may be arranged to identify it as originating from the power receiver that is currently in this mode, i.e. as the power receiver for which the power transmitter controller 201 is operating in the parameter setting mode.

Thus, in the specific example, if a message is received which can only be transmitted by a power receiver in the configuration or negotiation phase, the message processor 209 determines that this message is received from the first power receiver 105 as only the first power receiver 105 has requested that the power transmitter communicator 501 enters the parameter setting mode. Thus, in this scenario, the first power receiver 105 may transmit all messages that are of a type which can only be transmitted in these phases without including any temporary identity for the first power receiver 105. This may further reduce overhead yet still allows the origin of the received messages to be determined.

Thus, in some embodiments where a set of message types are specific to the parameter setting mode, the message processor 209 associates the received messages that are one of these types to the power receiver for which the parameter setting mode is active.

To provide a robust approach, the power transmitter 101 may be arranged to ensure that only one supported power receiver operates in the parameter setting mode at a time. Specifically, if the power transmitter 101 has already entered the parameter setting mode for one power receiver when a request message for entering a parameter setting mode is received from another power receiver, the power transmitter 101 proceeds to reject this request and accordingly it does not enter the parameter setting mode for this power receiver.

E.g. if a request message has been received from the first power receiver 105 and the power transmitter 101 is operating in the parameter setting mode for the first power receiver 105, the receipt of a request message requesting the power transmitter 101 to enter a parameter setting mode for the second power receiver 109 will result in the request being rejected. Therefore, the second power receiver 109 will not be allowed to change parameter settings until the first power receiver 105 has finished and exited the parameter setting mode.

In some embodiments, the time slot processor 207 is arranged to assign a set of the common time slots to the first power receiver 105 when a suitable message is received from the first power receiver 105. For example, when the message processor 209 detects that a request message for entering a parameter setting mode has been received from the first power receiver 105, it informs the time slot processor 207 which proceeds to allocate/reserve/assign a set of the common time slot to the first power receiver 105.

In some embodiments, the set of time slots may be a predetermined set, such as the time slot number in which the request message was received being reserved for the next N time frames (where N may depend on the preferences and requirements of the individual embodiment). For example, whenever a request for entering a parameter setting mode is received, the time slot processor 207 may proceed to reserve the same time slot in the next, say, 10 time slot frames to the power receiver from which the request was received.

In such a scenario, the power transmitter 101 may acknowledge the request to enter the parameter setting mode, and this acknowledgement also indicates to the first power receiver 105 (if this is the source of the request message) that the time slot is reserved in the next N (e.g. 10) frames.

Accordingly, the first power receiver 105 knows that it can use the same time slot in the next 10 time slot frames, and the power transmitter 101 knows that the first power receiver 105 will transmit a message in the time slot for the next 10 time slot frames.

Accordingly, the first power receiver 105 may proceed to transmit messages in the time slots without including any temporary identity of the first power receiver 105. The message processor 209 can still proceed to determine that the source power receiver for these messages is the first power receiver 105 as it is known that the first power receiver 105 transmits in the time slots.

Thus, in the example, at least one and possibly all of the messages communicated in the reserved set of common time slots does not include any temporary identity information indicative of source of the message. However, despite this lack of temporary identity information, the approach is not restricted to messages that are specific to the parameter setting mode but rather can be applied to any message transmitted from the power receiver.

The approach not only provides a reduced overhead by not including temporary identity information but also allows a more efficient operation in many scenarios. Indeed, by temporarily allocating common time slots to the power receiver which is entering the parameter setting mode, a more efficient parameter setting can be achieved.

In some embodiments, one or more of the messages communicated in the reserved set of time slots may include temporary identity information indicative of the temporary identity of the power receiver transmitting it, e.g. it may include bits indicating the time slot number of the dedicated time slot for the power receiver.

Thus, in some embodiments the power receiver transmitting the messages may include temporary identity information in some of the messages even though these are transmitted in temporarily reserved time slots.

This temporary identity information is accordingly redundant information but may provide additional robustness for the operation. For example, it may allow various fault conditions to be detected wherein a message is expected from one power receiver but is received from another power receiver.

It will be appreciated that different approaches for terminating the linking of a given temporary identity and a given power receiver may be used.

For example, a first temporary identity may be linked to the first power receiver 105 when a power transfer session is setup for the first power receiver 105 (e.g. during the initial configuration or negotiation phase). This association may be maintained until a predetermined event occurs or a predetermined criterion is met.

In many embodiments, the link is removed, i.e. the first temporary identity is released, when the dedicated time slot is released from the first power receiver 105. Thus, in many embodiments, the association of the temporary identity to the power receiver follows the allocation of the dedicated time slot to the power receiver. This may inherently be the case when the time slot number of the dedicated time slot is also used as the temporary identity for the power receiver being assigned the dedicated time slot.

In many embodiments, the link may be terminated when the power transfer session ends. This may specifically be determined to be the case when a power termination message is received from the power receiver. Thus, when the power receiver no longer requires power, it may transmit an end of power message to the power transmitter 101. In response, the power transmitter 101 may release the assigned temporary identity and dedicated time slot.

In some embodiments, the linking may be terminated in response to a detection of no messages being received from the first power receiver in a set of time slots that meet a criterion. For example, if no messages have been received from the power receiver for say, four, consecutive dedicated time slots, the identity controller 205 may proceed to remove the link between the first temporary identity and the first power receiver.

In the following, some of the approaches will be described with reference to a specific example compatible with a Qi type system (apart from the herein described differences and variations).

The Qi specification provides a mechanism for power transmitters and power receivers to agree on specific parameters that govern the power transfer. The current low power specification provides a method for power transmitters to resend their configuration information. Specifically, the power receiver may send an End Power Transfer/reconfigure (EPT/reconfigure) packet/message. As a result, the power transmitter and power receiver returns to the configuration phase. This enables the power receiver to update operational parameters such as the power control hold-off-time and maximum expected power usage.

Similarly, a negotiation phase may be provided to offer more flexibility for the power transmitter and power receiver to agree on parameters that govern the power transfer. These parameters comprise, amongst others, the guaranteed power required by the power receiver, the format of the received power reported by the power receiver, the modulation depth of the power transmitter to power receiver communications signal, and the maximum expected power usage. To return to the negotiation phase from the power transfer phase, a power receiver can send an EPT/renegotiate packet.

Thus, EPT messages can be transmitted to request that the power transmitter (re) enters the configuration or negotiation phase, i.e. the EPT messages are examples of request messages requesting that the power transmitter enters a parameter setting mode.

However, the approach has been designed for systems wherein the power transmitter provides power to only one power receiver at a time. In such systems, if a power transmitter receives an EPT/reconfigure or EPT/renegotiate packet, it is clear to the power transmitter from which power receiver the message was received, as there is a one-to-one correspondence between the power transmitter and the power receiver that is drawing power. In other words, it can only be from the supported power receiver.

However, when more than one power receiver is supported, this one-to-one correspondence is no longer present. Therefore, if a power transmitter receives an EPT/reconfigure of EPT/renegotiate packet, it is not a priori clear from which power receiver the request has originated.

However, it is required that the power transmitter is able to determine which power receiver is requesting the reconfiguration or renegotiation. For example, in the negotiation phase, a power receiver can reserve an amount of power from the total power budget that the power transmitter has available. This reserved amount of power is called the guaranteed power. The power receiver simply requests that the power transmitter reserves the requested power. If the power transmitter grants the request, it registers the requested amount of power as being reserved to this power receiver. When a new request is received, the power transmitter has to determine from which power receiver the request originated. Otherwise, the power transmitter cannot keep its accounting of its power budget in order.

One possibility is for the power receiver to transmit its identity number to the power transmitter together with the EPT messages. However, it is cumbersome to include this data in each data packet during reconfiguration or renegotiation. Indeed this identification data consists of 48 bit, and therefore is very long compared to the short data messages. Indeed, because of the finite length of the time slots, the data packets/messages are quite short and it is very inefficient to send data packets that contain more identity than payload data. Yet another disadvantage is that the requirement to include identification data in each packet during reconfiguration or renegotiation prevents re-use of packets that have already been defined for this purpose in the current specifications. The ability to re-use these packets is advantageous, because power transmitters and power receivers must anyway be able to handle such packets in order to operate with legacy equipment The approach described in the following for reconfiguration and renegotiation does not require the addition of a power receiver identifier in packets that are used during reconfiguration and renegotiation, thereby enabling re-use of the packets which have already been defined for that purpose in the low power and medium power specifications. The proposed method achieves this feat by ensuring that only one power receiver can be in the configuration or negotiation phase at a time. If the power transmitter knows which power receiver is in one of these phases, it automatically knows from which power receiver the data packets originate that pertain to the configuration and negotiation phase of the protocol, and accordingly no identifier is needed in the data packets. The power receiver may instead provide the temporary identification data in its EPT/reconfigure and/or EPT/renegotiate packet.

In the system, a power receiver can request a return from the power transfer phase to the configuration and/or negotiation phase. The power transmitter can either accept or reject such a request. This enables the power transmitter to control how many power receivers are in the configuration and negotiation phases. However, if the request to return to the configuration and/or negotiation phase is anonymous, the power transmitter cannot know for which power receiver it accepts or requests the request. Therefore, the power receiver can include temporary identifying information in the data packets of the configuration and negotiation phases. For example, the identification information could consist of the slot number that the power receiver is using for its control information packet. However, this approach does not support re-use of already existing packets which do not include such information and it may also introduce an overhead to each message.

Instead, the temporary identity information may be included in the EPT packet, i.e. in the request message, but not in the actual messages of the configuration and negotiation phase.

Specifically, instead of just using fixed values, such as EPT codes 0x07 (reconfigure) and 0x09 (renegotiate), a power receiver may use EPT codes that also identify the power receiver by including the temporary identity for the power receiver.

For example, to return to the configuration phase,
a power receiver that uses the $1^{st}$ slot for its control information may use EPT code 0x21;
a power receiver that uses the $2^{nd}$ slot for its control information may use EPT code 0x22;
. . .
a power receiver that uses the $9^{th}$ slot for its control information may use EPT code 0x29.

In addition, to return to the negotiation phase,
a power receiver that uses the 1$^{st}$ slot for its control information may use EPT code 0x31;
a power receiver that uses the 2$^{nd}$ slot for its control information may use EPT code 0x32;
...
a power receiver that uses the 9$^{th}$ slot for its control information may use EPT code 0x39;

Based on these EPT codes, a power transmitter knows for which power receiver it enters the configuration or negotiation phase, and because it allows only one power receiver at a time to be in one of these two phases, it does not need additional identification information in the packets/messages that are specific to these phases.

The EPT coder may specifically be generated with two fields, namely one indicating the temporary identity and one indicating the nature of the request (the EPT value) This can be done by organizing the EPT code in two fields as follows:

| B7 | B6 | B5 | B4 | B3 | B2 | B1 | B0 |
|----|----|----|----|----|----|----|----|
| Power receiver ID | | | | EPT value | | | |

Here, the EPT code can be the same as already defined in the low power and medium power specification. In particular, in order to request the power transmitter to terminate power transfer because charging is complete, the power receiver may set the EPT value to 0x1; to request a return to the configuration phase, the power receiver may set the EPT value to 0x7; and to request a return to the negotiation phase, the power receiver may set the EPT value to 0x9. If the power receiver is operating according to an earlier version of the specifications, it may set the power receiver ID field to 0x0. However, if is supporting multiple power receivers, it may set the power receiver ID field to indicate the dedicated time slot that it uses for transmitting time critical control information. This approach yields a different coding than the EPT code in the examples given above. For example, to return to the negotiation phase, this approach may result in e.g. the following EPT codes:
a power receiver that uses the 1$^{st}$ slot for its control information may use EPT code 0x19;
a power receiver that uses the 2$^{nd}$ slot for its control information may use EPT code 0x29;
...
a power receiver that uses the 9$^{th}$ slot for its control information may use EPT code 0x99;

In some embodiments, the request for entering the parameter setting mode may be transmitted in a message transmitted in the dedicated time slot. E.g. the first power receiver 105 may transmit a request for entering the parameter setting mode in the dedicated time slot for the first power receiver 105. The identity controller 205 may then proceed to determine a temporary identity for the parameter setting mode in response to the dedicated time slot in which the request was received. The temporary identity may then be included in messages of the parameter setting mode transmitted in the common time slots.

As a specific example, a request for re-configuration or re-negotiation can be transmitted to the power transmitter 101 by the first power receiver 105 setting a bit in a message transmitted in the dedicated time slot as part of the ongoing communication of time critical information. For example, for a Qi type system, the first power receiver 105 may set a bit in a CI packet communicated in a dedicated slot. The acknowledgement of the request further indicates that the power transmitter 101 not only accepts the request but also that it considers the first power receiver 105 to be assigned the temporary identity corresponding to the time slot number of the time slot in which the CI message was sent. The first power receiver 105 then proceeds to perform the re-negotiation using messages transmitted in the common time slots and including temporary identity information indicative of the temporary identity It will be appreciated that the above description for clarity has described embodiments of the invention with reference to different functional circuits, units and processors. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for a wireless power transfer system, the power transmitter comprising:
   at least one transmit inductor arranged to generate a wireless inductive power signal for providing power to a plurality of power receivers powered by the power transmitter;
   a receiver for receiving data messages on a load modulation channel for load modulation of the wireless inductive power signal by the plurality of power receivers, the load modulation channel being divided into time slot frames with each time slot frame comprising a set of time slots;
   a time slot processor arranged to allocate time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers;

an identity controller for linking a temporary identity to each of the plurality of power receivers, the temporary identity being different for each power receiver of the plurality of power receivers; and a message processor arranged to determine a source power receiver for messages from the plurality of power receivers in response to temporary identity information in the messages;

wherein the identity controller is arranged to assign a first temporary identity to a first power receiver of the plurality of power receivers, the first power receiver being allocated a first dedicated time slot; and the message processor is arranged to determine the source power receiver for a first message received in a common time slot as the first power receiver in response to the temporary identity information in the first message being indicative of the first temporary identity.

2. The power transmitter of claim 1 wherein the first temporary identity comprises an indication of the first dedicated time slot.

3. The power transmitter of claim 1 wherein the time slot processor is arranged to assign a set of common time slots to the first power receiver in response to receiving the first message; and the message processor is arranged to determine the first power receiver as the source power receiver for load modulation messages received in the set of common time slots.

4. The power transmitter of claim 3 wherein the message processor is arranged to determine the first power receiver as the source power receiver for at least one load modulation message received in the set of common time slots and not comprising temporary identity information indicative of the first temporary identity.

5. The power transmitter of claim 3 wherein at least one of the messages received in the set of common time slots includes temporary identity information indicative of the first temporary identity.

6. The power transmitter of claim 1 wherein the first message is a request message requesting the power transmitter to enter a parameter setting mode for setting of an operational parameter for the power transfer to the source power receiver; and the power transmitter comprises:

a setting processor arranged to adapt the parameter setting mode to set parameters for the source power receiver.

7. The power transmitter of claim 6 wherein a set of message types are specific to the parameter setting mode; and the message processor is arranged to associate received messages of a type belonging to the set of message types to the source power receiver when the parameter setting mode is active.

8. The power transmitter of claim 6 wherein the power transmitter is arranged to reject a request to enter a parameter setting mode for a second power receiver if the power transmitter is operating in a parameter setting mode for the first power receiver.

9. The power transmitter of claim 1 wherein the identity controller is arranged to terminate the link between the first temporary identity and the first power receiver in response to at least one of:

a detection of no messages being received from the first power receiver in a set of time slots meeting a criterion;

a power transfer termination message being received from the first power receiver;

a termination of a power transfer session to the first power receiver; and a release of a dedicated time slot for the first power receiver.

10. A wireless power transfer system comprising a power transmitter arranged to provide a power transfer to a plurality of power receivers via a wireless inductive power signal, wherein the power transmitter comprises:

at least one transmit inductor arranged to the a wireless inductive power signal, a receiver for receiving data messages on a load modulation channel for load modulation of the wireless inductive power signal by the plurality of power receivers, the load modulation channel being divided into time slot frames with each time slot frame comprising a set of time slots, a time slot processor arranged to allocate time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers, an identity controller for linking a temporary identity to each of the plurality of power receivers, the temporary identity being different for each power receiver of the plurality of power receivers, and a message processor arranged to determine a source power receiver for messages from the plurality of power receivers in response to temporary identity information in the messages, and the identity controller is arranged to assign a first temporary identity to a first power receiver of the plurality of power receivers, the first power receiver being allocated a first dedicated time slot, and the message processor is arranged to determine the source power receiver for a first message received in a common time slot as the first power receiver in response to the temporary identity information in the first message being indicative of the first temporary identity; and at least one power receiver of the plurality of power receivers comprises:

at least one receive inductor arranged to extract power from the wireless inductive power signal, a transmitter for transmitting data messages to the power transmitter by load modulation of the wireless inductive power signal, a time slot controller arranged to control the transmitter to transmit the data messages in either dedicated time slots assigned to the power receiver or in common time slots available for load modulation by any power receiver of the plurality of power receivers, and a message generator arranged to include temporary identity information indicative of a first temporary identity assigned to the power receiver in at least one data message transmitted in a common time slot.

11. A method of operation for a power transmitter of a wireless power transfer system, the method comprising:

generating a wireless inductive power signal for providing power to a plurality of power receivers powered by the power transmitter;

receiving data messages on a load modulation channel for load modulation of the wireless inductive power signal by the plurality of power receivers, the load modulation channel being divided into time slot frames with each time slot frame comprising a set of time slots;

allocating time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers;

linking a temporary identity to each of the plurality of power receivers, the temporary identity being different for each power receiver of the plurality of power receivers; and determining a source power receiver for messages from the plurality of power receivers in response to temporary identity information in the messages;

wherein the linking comprises linking a first temporary identity to a first power receiver of the plurality of power receivers, the first power receiver being allocated a first dedicated time slot; and the determining of the source power receiver comprises determining the source power receiver for a first message received in a common time slot as the first power receiver in response to the temporary identity information in the first message being indicative of the first temporary identity.

12. A method of operation for a wireless power transfer system comprising a power transmitter arranged to provide a power transfer to a plurality of power receivers via a wireless inductive power signal, the method comprising:

the power transmitter performing the steps of:
generating the wireless inductive power signal for providing power to a plurality of power receivers powered by the power transmitter;

receiving data messages on a load modulation channel for load modulation of the wireless inductive power signal by the plurality of power receivers, the load modulation channel being divided into time slot frames with each time slot frame comprising a set of time slots;

allocating time slots of the set of time slots to the plurality of power receivers, the time slot allocator being arranged to allocate each time slot of a first set of time slots as dedicated time slots for power receivers of the plurality of power receivers, and time slots of a second set of time slots as common time slots available for load modulation by any power receiver of the plurality of power receivers;

linking a temporary identity to each of the plurality of power receivers, the temporary identity being different for each power receiver of the plurality of power receivers; and determining a source power receiver for messages from the plurality of power receivers in response to temporary identity information in the messages;

wherein the linking comprises linking a first temporary identity to a first power receiver of the plurality of power receivers, the first power receiver being allocated a first dedicated time slot; and the determining of the source power receiver comprises determining the source power receiver for a first message received in a common time slot as the first power receiver in response to the temporary identity information in the first message being indicative of the first temporary identity;

and at least the first power receiver performing the steps of:
extracting power from the wireless inductive power signal;

transmitting data messages to the power transmitter by load modulation of the wireless inductive power signal;

controlling the transmitter to transmit the data messages in either dedicated time slots assigned to the power receiver or in common time slots available for load modulation by any power receiver of the plurality of power receivers; and including temporary identity information indicative of a first temporary identity assigned to the power receiver in at least one data message transmitted in a common time slot.

* * * * *